United States Patent
Rae (10) Patent No.: US 10,294,024 B2
(45) Date of Patent: May 21, 2019

(54) SKIP FOR DOMESTIC AND/OR INDUSTRIAL WASTE

(71) Applicant: Harben Emarand Limited, Nottinghamshire (GB)

(72) Inventor: John Paul Rae, Ayrshire (GB)

(73) Assignee: Harben Emarand Limited, Nottinghamshire (GB)

( * ) Notice: Subject to any disclaimer, the term of this patent is extended or adjusted under 35 U.S.C. 154(b) by 0 days.

(21) Appl. No.: 15/310,883

(22) PCT Filed: May 13, 2015

(86) PCT No.: PCT/GB2015/051398
§ 371 (c)(1),
(2) Date: Nov. 14, 2016

(87) PCT Pub. No.: WO2015/173560
PCT Pub. Date: Nov. 19, 2015

(65) Prior Publication Data
US 2017/0088353 A1    Mar. 30, 2017

(30) Foreign Application Priority Data

May 13, 2014 (GB) .................................. 1408433.9

(51) Int. Cl.
*B60P 1/04* (2006.01)
*B65F 1/16* (2006.01)
(Continued)

(52) U.S. Cl.
CPC ............ *B65F 1/1646* (2013.01); *B60P 1/286* (2013.01); *B65F 1/0046* (2013.01); *B65F 1/02* (2013.01);
(Continued)

(58) Field of Classification Search
CPC .... B65F 1/1646; B65F 1/0046; B65F 1/1615; B65F 2210/148; B65F 2210/169; B65F 1/147; B60P 1/286
(Continued)

(56) References Cited

U.S. PATENT DOCUMENTS 1,844,727 A * 2/1932 Vorst .................... B62D 63/062
                                                      180/69.25
4,585,266 A * 4/1986 Steinberg ................. A01C 3/06
                                                      105/377.05

(Continued)

FOREIGN PATENT DOCUMENTS

DE        3805375 A1    10/1988

OTHER PUBLICATIONS

International Search Report and Written Opinion for Application No. PCT/GB2015/051398 dated Nov. 5, 2015 (20 pages).

*Primary Examiner* — Stephen T Gordon
(74) *Attorney, Agent, or Firm* — Michael Best & Friedrich LLP (57) ABSTRACT

A skip (10) for domestic and/or industrial waste, the skip (10) comprising a body (12), the body (12) defining an opening (16) and having an interior (14) adapted to receive waste, and a plurality of doors (20, 22, 24, 26) attached to the body (12), each door (20, 22, 24, 26) being movable between an open position and a closed position, the doors (20, 22, 24, 26) combining in the closed position to seal the opening (16).

22 Claims, 8 Drawing Sheets

(51) Int. Cl.
*B65F 1/02* (2006.01)
*B65F 1/12* (2006.01)
*B65F 1/14* (2006.01)
*B65F 1/00* (2006.01)
*B60P 1/28* (2006.01)

(52) U.S. Cl.
CPC .............. *B65F 1/12* (2013.01); *B65F 1/1468* (2013.01); *B65F 1/1473* (2013.01); *B65F 1/16* (2013.01); *B65F 1/1615* (2013.01); *B65F 2001/1489* (2013.01); *B65F 2210/148* (2013.01); *B65F 2210/169* (2013.01); *B65F 2210/176* (2013.01); *B65F 2220/128* (2013.01)

(58) Field of Classification Search
USPC ............ 298/5, 6, 18, 22 R, 17 SG, 17 T, 38; 280/402, 493; 414/480, 482, 483, 485; 296/100.07, 101
See application file for complete search history.

(56) References Cited

U.S. PATENT DOCUMENTS

| | | | |
|---|---|---|---|
| 5,039,271 A * | 8/1991 | Julian | ...................... B62B 1/24 298/17 SG |
| 5,544,944 A * | 8/1996 | Keech | ...................... B60P 1/24 298/5 |
| 2002/0008104 A1 | 1/2002 | Pickler | |
| 2006/0006188 A1 | 1/2006 | Williams | |

* cited by examiner

SKIP FOR DOMESTIC AND/OR INDUSTRIAL WASTE

FIELD OF THE INVENTION

The present invention relates to an improved skip for disposing of commercial and industrial waste. Particularly, but not exclusively, the present invention relates to a mobile skip for disposing of waste.

BACKGROUND TO THE INVENTION

Skips for disposing of commercial and industrial waste are well known. Conventional skips are delivered by a lorry and are lifted on and off the lorry using chains. Once the skip is in position, it is immobile and generally open to the elements.

Conventional skips have an open top for receiving commercial and industrial waste and there is often a manual handling issue to be addressed when a conventional skip has to be loaded as the waste being disposed of has to be hoisted into the skip manually or by, for example, a fork lift truck.

Furthermore, conventional skips generally define a single interior space with the consequence that simple sorting of waste products into different types, for example, is not easily possible.

Once the skip is filled, it is collected by a lorry and taken to a waste disposal or cycling plant for emptying prior to disposal by whatever means, which, again, requires manual handling or special equipment.

SUMMARY OF THE INVENTION

According to a first aspect of the present invention there is provided a skip for domestic and/or industrial waste, the skip comprising:

a body, the body defining an opening and having an interior adapted to receive waste, and a plurality of doors attached to the body, each door being movable between an open position and a closed position, the doors combining in the closed position to seal the opening;

wherein the skip is arranged such that, in use, in the open position, a user can walk or step into the opening from ground level and unencumbered access to the body interior is provided.

In at least one embodiment of the present invention, providing a skip with doors such that in the open position a user can walk or step into the body interior from ground level, eliminates many manual handling issues associated with conventional skips. Providing unencumbered access, that is having the skip arranged with no interior struts, supports or ties for the user to negotiate to access the skip interior, further improves the user's safety and adds to the versatility and utility of the product.

The plurality of doors may comprise at least one first door and at least one second door.

The/each at least one first door may be adapted to open such that a first door lower edge is substantially parallel to the ground at all times. Essentially, this or these first doors open like a conventional door in a building.

The/each at least one first door may be a horizontally opening door. That is the door may swing in an arc which is substantially horizontal.

The/each at least one second door may be adapted to open such that a second door lower edge is substantially parallel to the ground in the closed position and at an angle to the ground in the open position. This or these doors are adapted to open essentially upwards.

The/each at least one second door may be a vertically opening door. That is the door may swing in an arc which is substantially vertical.

The at least one first door and the at least one second door may, in the closed position, be at an obtuse angle to one another.

In the closed position, the at least one first door and the at least one second door may be in contact along a common edge.

The at least one first door may be hingedly attached to the body along a side edge or a lower edge of the/each door. The preferred embodiment utilises a hinge along the side edge of the door. This may be a vertical hinge.

The lower edge may be used to allow the door to be used as an access ramp.

The at least one second door may be hingedly attached to the body along a side edge or a top edge of the/each door. The hinge may be a horizontal hinge.

Alternatively or additionally, the at least one second door may be hingedly attached to the at least one first door.

The at least one second door may be hingedly attached to the body along one edge and hingedly attached to the at least one first door along an opposite edge. In such an arrangement, the at least one second door can be opened to provide access from either end of the skip.

The at least one second door may be adapted to deflect waste into the skip.

In a preferred embodiment there are two first doors and two second doors.

In the closed position the doors may be arranged such that one of the doors retains the other door or doors in the closed position.

In the closed position the doors may be arranged such that fixedly securing one door with respect to the body fixedly secures the other door or doors with respect to the body.

A locking means may be provided to fixedly secure the doors in the closed position.

The body may comprise at least one wall and a base.

The at least one wall may be a plurality of walls.

The at least one of the at least one wall may have a non-linear cross-section.

Particularly at least one of the walls may define a kinked cross-section. A kinked cross-section increases the strength of the wall. By strengthening the walls in this way, additional strengthening equipment such as braces spanning the width or at least part of the width, of the skip are not required. In this embodiment, unencumbered access to the body interior is provided, an improvement over the prior art in which braces are provided to provide strength to the body which utilises fully planar materials with the associated increased thickness and, consequently, and increased weight.

The at least one wall may comprise a corrugated material. In at least one embodiment of the present invention a corrugated wall has greater mechanical resistance without significantly increasing is weight.

The at least one wall may define one or more apertures. In at least one embodiment of the present invention a wall that defines apertures has less weight whereas its mechanical resistance is not significantly compromised.

The at least one wall may comprise a mesh portion. In at least one embodiment of the present invention a mesh portion can effectively confine the waste or residue without significantly increasing its weight.

The at least one wall may be configured to allow air ingress for aerating and composting waste contained in the body.

The at least one wall may comprise a transparent section. In at least one embodiment of the present invention a wall with a transparent section allows visibility into the body without having to open the doors.

The skip may further comprise one or more partitions adapted to divide up the body interior.

The/each partition may be adapted to divide a section of the body interior into smaller section.

Each section may be associated with at least one door.

In one embodiment the skip is segregated to allow waste materials such as recycling, for example to be sorted during disposal.

The/each partition may be releasably connected to the body.

The skip may be arranged such that material enters the skip through the at least one second door and exits the skip through the at least one first door.

The skip may further comprise a frame, the body being adapted to be mounted on the frame.

The frame may be a trailer adapted to be releasably connectable to, for example, a vehicle.

The body may be fixed to the frame.

Alternatively the body may be movable with respect to the frame.

The body may be pivotally attached to the frame.

The skip may further comprise elevation means adapted to elevate at least a portion of the body with respect to the frame. Elevation means can elevate or tip the body portion to assist in emptying the skip.

The elevation means may pivot the body portion with respect to the frame.

The elevation means may move the body from a load position to an unload position, waste material within the skip being biased towards the opening in the unload position due to the effects of gravity.

The body portion may be the entire body.

In other embodiments the body portion may be at least the base of the body.

The skip may further include a waste processing device.

The waste processing device may be a shredder for shredding or chipping horticultural waste.

Alternatively or additionally the processing device may be adapted to sort waste.

According to a second aspect of the present invention there is provided a skip for domestic and/or industrial waste, the skip comprising:

a body, the body defining an opening and having an interior adapted to receive waste, the body comprising a least one wall, at least one of the walls having a non-linear cross-section adapted to strengthen the wall;

wherein, in use, a user can walk or step into skip body interior through the body opening from ground level and unencumbered access to the body interior is provided.

In at least some embodiments, providing a skip with walls having a non-linear cross section strengthens the walls of the skip such that internal bracing means are not required to strengthen the skip, thereby reducing the risk of injury to a user entering the skip interior and maximising the space available for utilisation in the skip.

According to a third aspect of the present invention there is provided a skip for domestic and/or industrial waste, the skip comprising:

a body, the body defining an opening and having an interior adapted to receive waste; and a frame, the body being moveably attached to the frame, the body being movable with respect to the frame from a load position to an unload position, in the unload position, in use, waste stored within the frame is biased towards the opening due to the effect of gravity.

According to a fourth aspect of the present invention there is provided a skip for domestic and/or industrial waste, the skip comprising:

a body, the body defining an opening and having an interior adapted to receive waste;

a frame, the body being attached to the frame; and a processing device, the processing device having an inlet adapted to receive waste and an outlet adapted to deliver processed waste to the skip interior.

It will be understood that features listed as non-essential with respect to the first aspect may be equally applicable to the subsequent aspects but have not been repeated for brevity.

BRIEF DESCRIPTION OF THE DRAWINGS

Embodiments of the present invention will now be described with reference to the accompanying drawings in which.

DETAILED DESCRIPTION OF THE DRAWINGS

Figure 1:
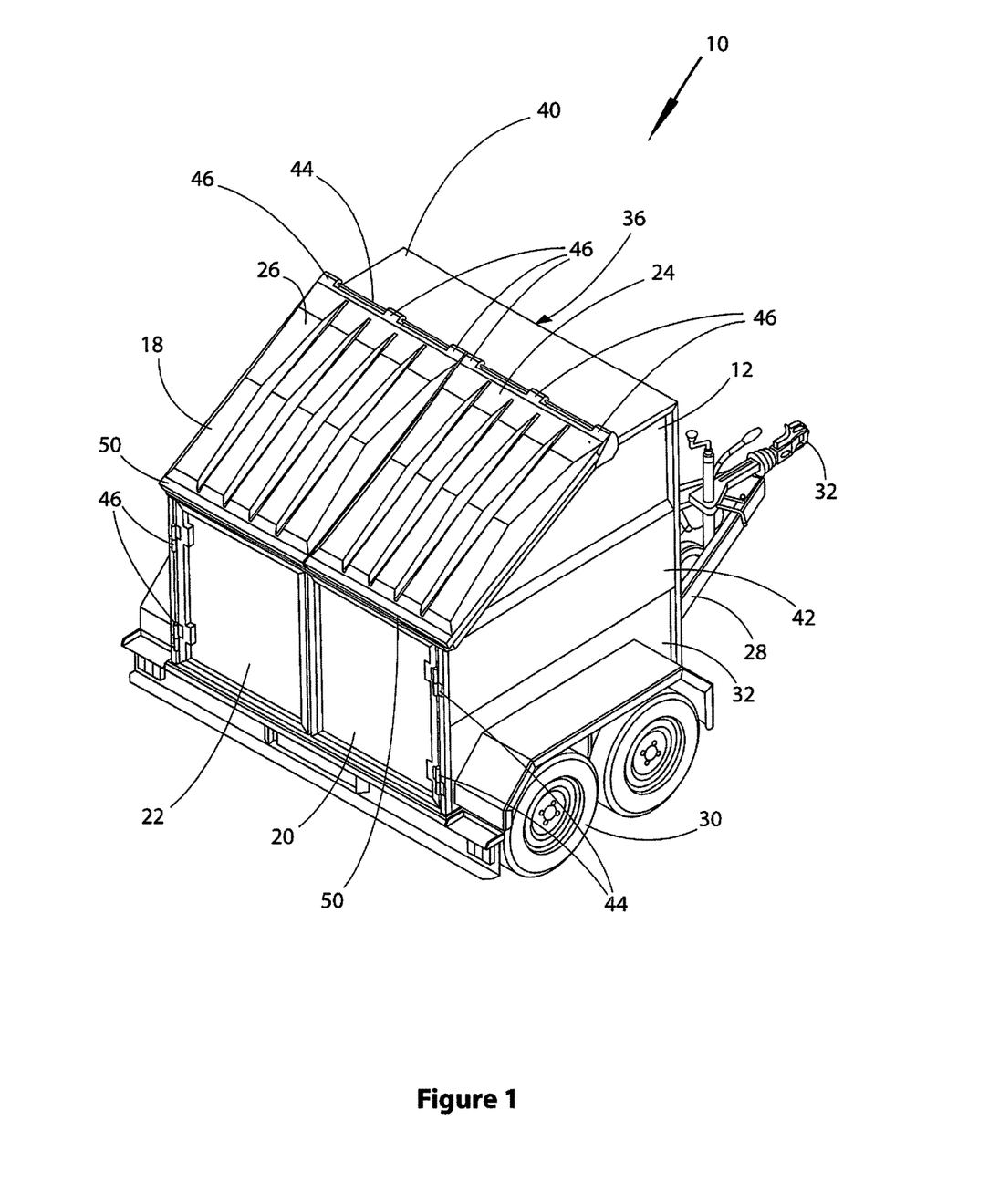
FIG. 1 is a perspective view of an improved skip according to a first embodiment of the present invention.
Figure 2:
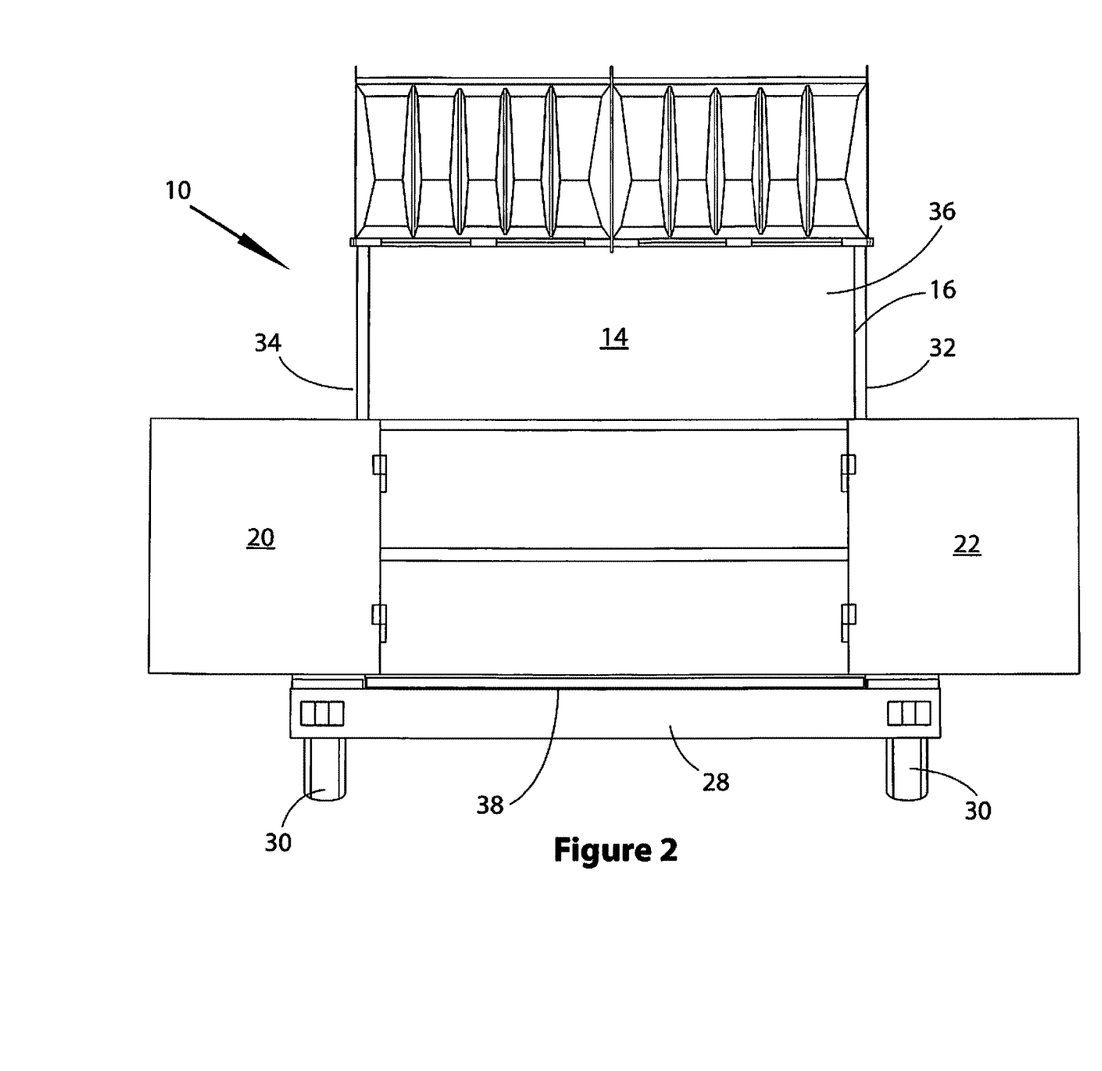
FIG. 2 is an end view of the skip of FIG. 1 shown with the first set of doors open and the second set of doors open.

Reference is first made to FIG. 1, a perspective view of an improved skip, generally indicated by reference numeral 10, according to a first embodiment of the present invention; FIG. 2, an end view of the skip 10 of FIG. 1 and FIG. 4, a plan view of the skip 10 of FIG. 1.

Figure 4:
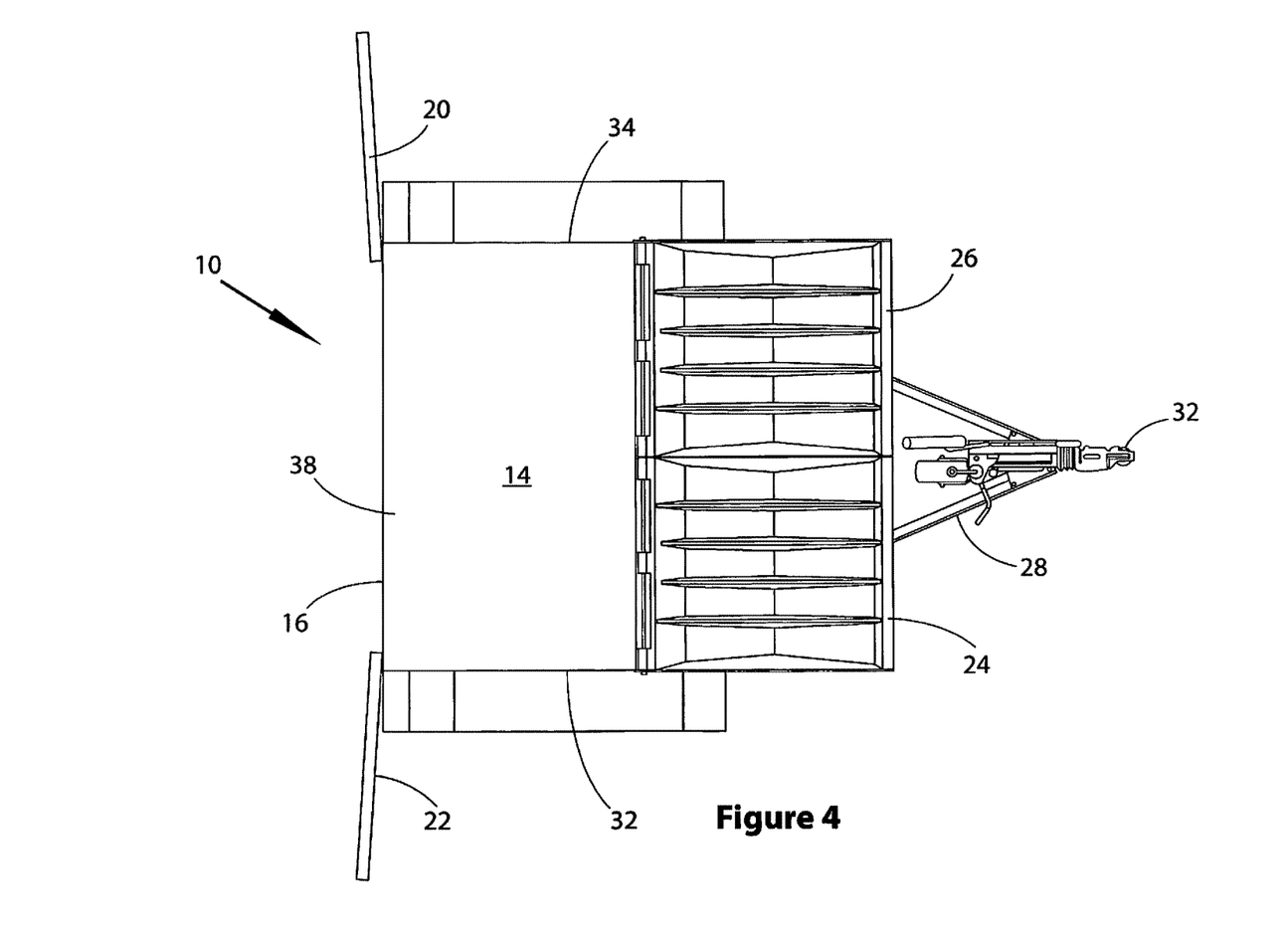
FIG. 4 is a plan view of the skip of FIG. 1 shown with the first set of doors open and the second set of doors open.

The skip 10 comprises a body 12 having an interior 14 adapted to receive waste (not shown). The body 10 also defines an opening 16 for providing access to the interior 14.

The skip 10 further comprises a plurality of doors 18, particularly the skip 10 comprises a pair of horizontally opening doors 20, 22 and a pair of vertically opening doors 24, 26, each door 18 being movable between an open position (shown in FIGS. 2 and 4) and a closed position shown in FIG. 1, the doors 18 co-operating, in the closed position, to seal the opening 16.

The skip 10 further comprises a trailer 28 having wheels 30 and a tow hitch 32, the body 12 being mounted to the trailer 28 and the tow hitch 32 providing connection to a vehicle (not shown) and permitting the skip 10 to be towed by a conventional vehicle with a tow bar.

Figure 3:
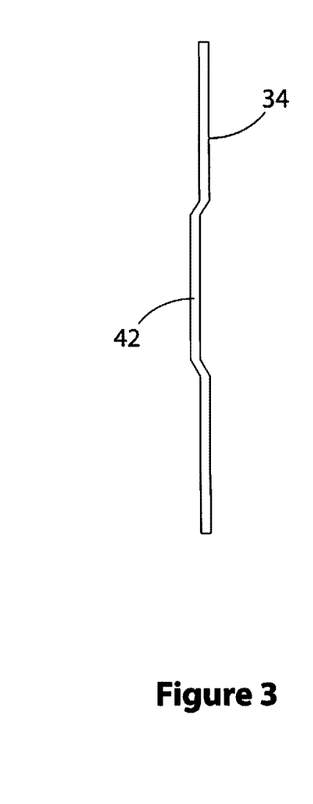
FIG. 3 is a section through a side wall of the skip of FIG. 1.

The skip body 12 comprises a first side wall 32, a second side wall 34, a rear wall 36, base 38 and a top 40. As can be best seen from FIG. 1, the first side wall 32 is non-linear in that it defines a kink 42. Referring to FIG. 3, a section through the second side wall 34, the kink 42 is a bulge which extends from the wall 38.

The purpose of this kink 42 is to strengthen the wall. By incorporating this kink 42 into the sidewalls 32, 34 and the rear wall 36, sufficient strength is provided to the body 12 when the walls 32, 34, 36 are secured to the base 38 and the top 40 to obviate the need for internal bracing structures in the skip interior 14.

Accordingly, the skip 10 is adapted when the doors 18 are in the open position to facilitate a user being able to walk or step into the skip interior 14 from ground level to load or unload the skip 10 without having to negotiate internal structures within the skip 10. This arrangement reduces manual handling issues associated with raising debris to drop it into a conventional skip and the specialist equipment required to empty and conventional skip. A skip 10 according to this embodiment of the present invention, has the additional advantage of being completely mobile due to the integral trailer 28 which can be towed a conventional vehicle.

Referring primarily to FIG. 1, the pair of horizontally doors 20, 22 are attached to the body sidewalls 32, 34 by a first pair of hinges 44 (in the case of the first horizontally opening door 20) and a second pair of hinges 46 (in the case of the second horizontally opening door 22). The use of side hinges 44, 46 means the pair of horizontally opening doors 20, 22 open like conventional doors by the user pulling them outwards.

The pair of vertically opening doors 24, 26 are attached to the body top 40 by a bar 44 passing through six hinge loops 46 defined by the first and second vertically opening doors 24, 26. The use of this sort of hinge 40,46 means the pair of vertically opening doors 24, 26 open by subjecting them to an upward push.

The vertically opening doors 24, 26 include a front lip 50, 52 which, in the closed position, hangs down in front of the horizontally opening doors 20, 22, preventing the horizontally opening doors 20, 22 from opening.

Additionally, the second vertically opening door lip 52, overlaps the front of the first vertically opening door lip 50 such that with the doors in the closed position, both of the horizontally opening doors 20, 22 and the first vertically opening door 24 are held shut by the second vertically opening door 26.

Although not shown on these Figures, a locking mechanism such as a loop and padlock can be provided to lock all four doors 20, 22, 24, 26 shut.

Figure 5:
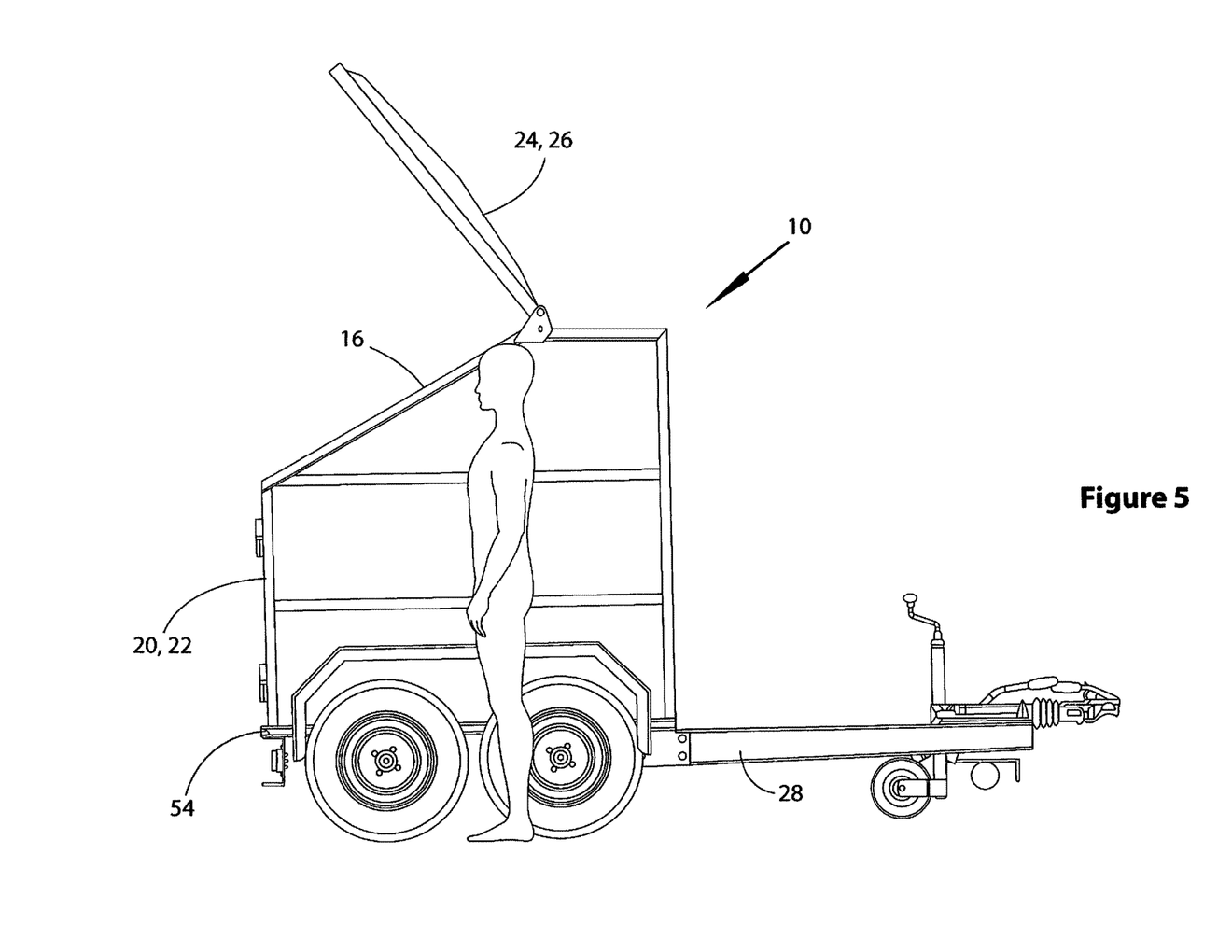
FIG. 5 is a side view of the skip of FIG. 1 shown with the second set of doors open.

Referring to FIG. 5, the skip 10 can be used with the horizontally opening doors 20, 22 shut and only the vertically opening doors 24, 26 open. This is of use when the skip 10 is partially filled and opening the horizontally opening doors 20, 22 would allow waste material in the skip interior 14 to fall out of the skip 10 due to the effect of gravity, through the open doors 20, 22. To facilitate loading through the opening 16 created by the vertically opening doors 24, 26 being in the open position and the horizontally opening doors 20, 22 being in the closed position, a step 54 is provided on the trailer 28.

Figure 6:
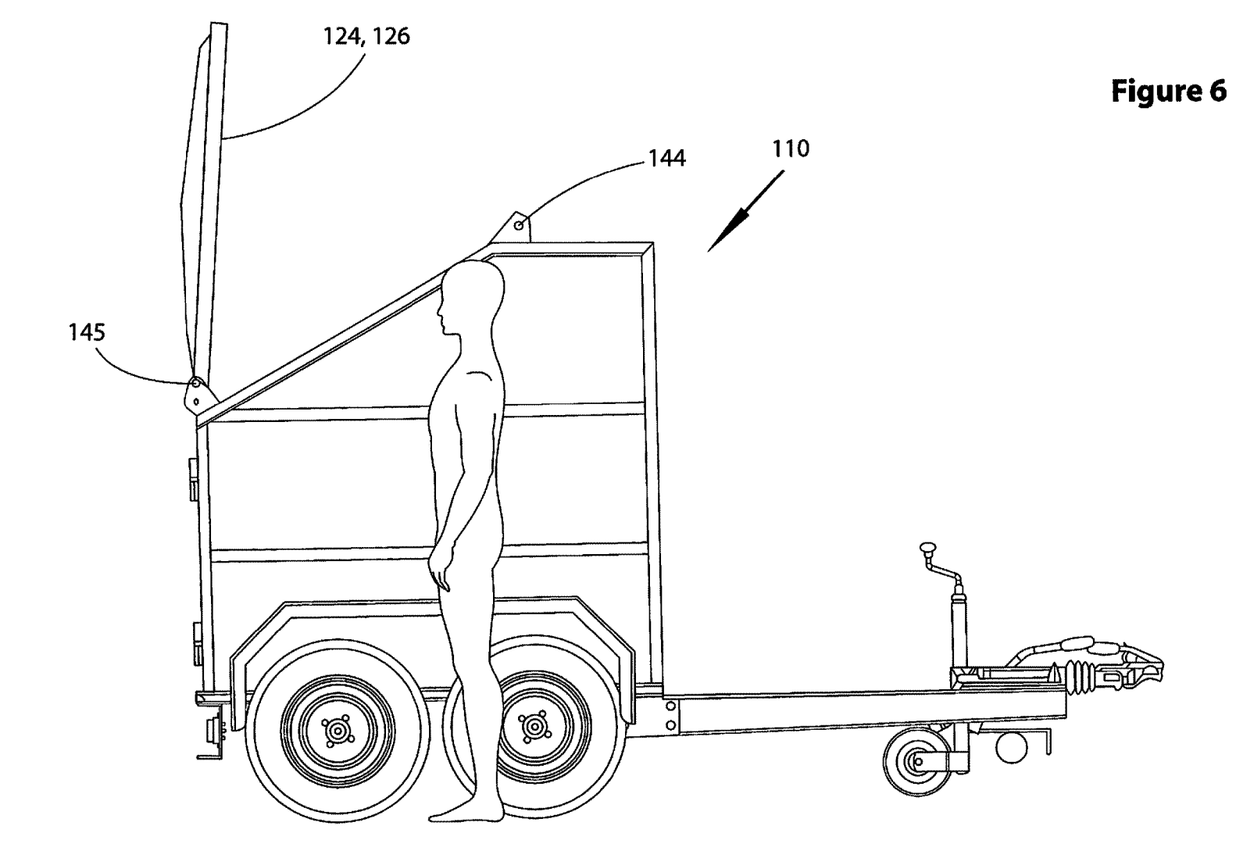
FIG. 6 is a side view of an improved skip according to a second embodiment of the present invention with the second set of doors open.

Referring now to FIG. 6, a side view of a skip 110 is shown in accordance with a second embodiment of the present invention. This skip 110 is similar in many respects to the skip 10 of the first embodiment, however in this embodiment, the vertically opening doors 124, 126 are provided with two hinge bars 144, 145, either of which can be selected to form the hinge permitting the vertically opening doors 124, 126 to be opened either as shown in the case of the doors 24, 26 of the first embodiment shown in FIG. 5 or as shown in FIG. 6.

Figure 7:
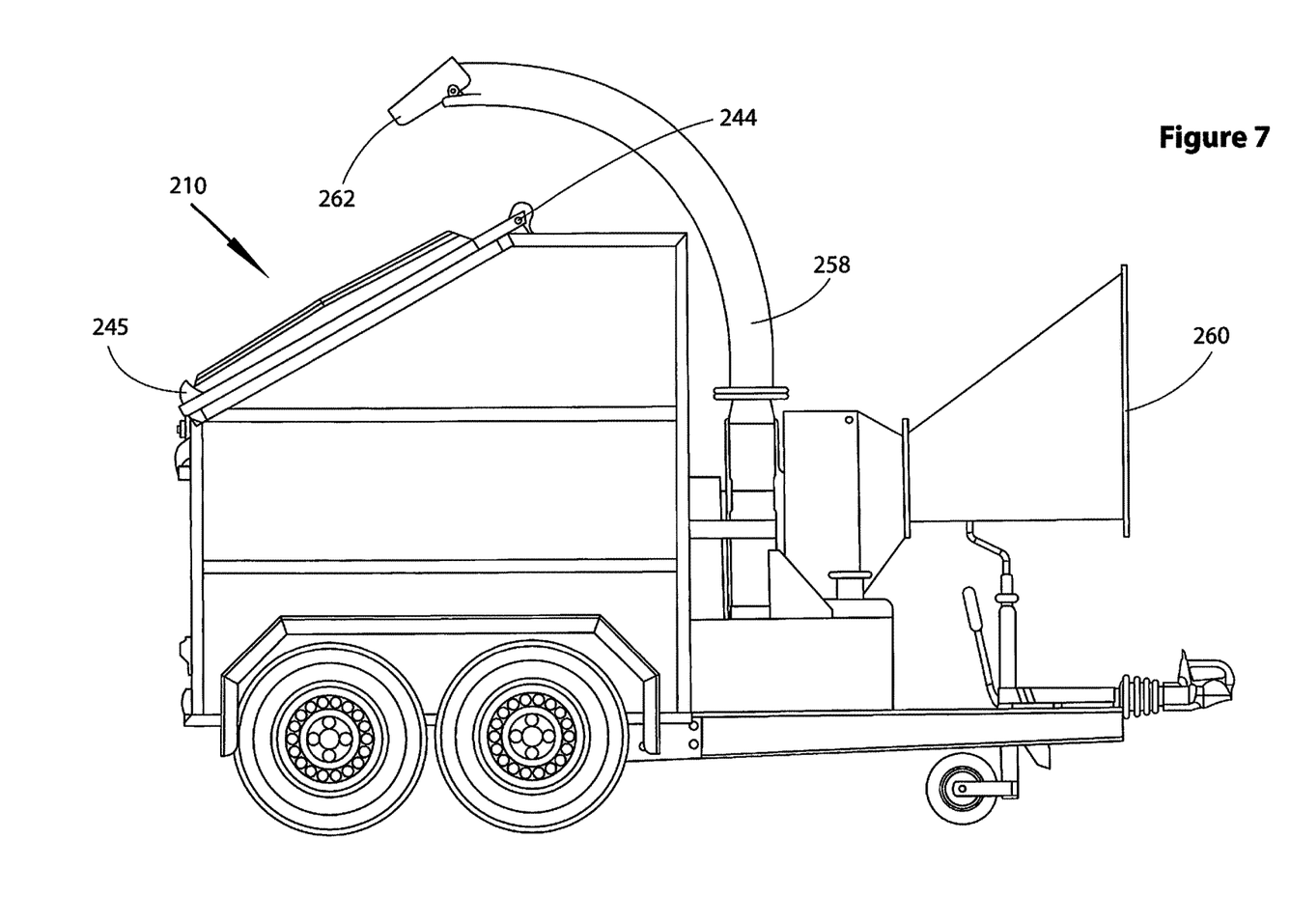
FIG. 7 is a side view of an improved skip according to a third embodiment of the present invention.

This arrangement has utility for, for example when the skip 10 incorporates a processing means of the sort shown in FIG. 7, a side view of the skip 210 according to a third embodiment of the present invention. In this embodiment, the processing means is a shredder 258 which has an inlet 260 for receiving branches and the like, and an outlet 262 for depositing a shred of material into the skip body 212. In this embodiment providing rear and front hinges 244, 245 makes filling and emptying the skip 210 easier.

Figure 8:
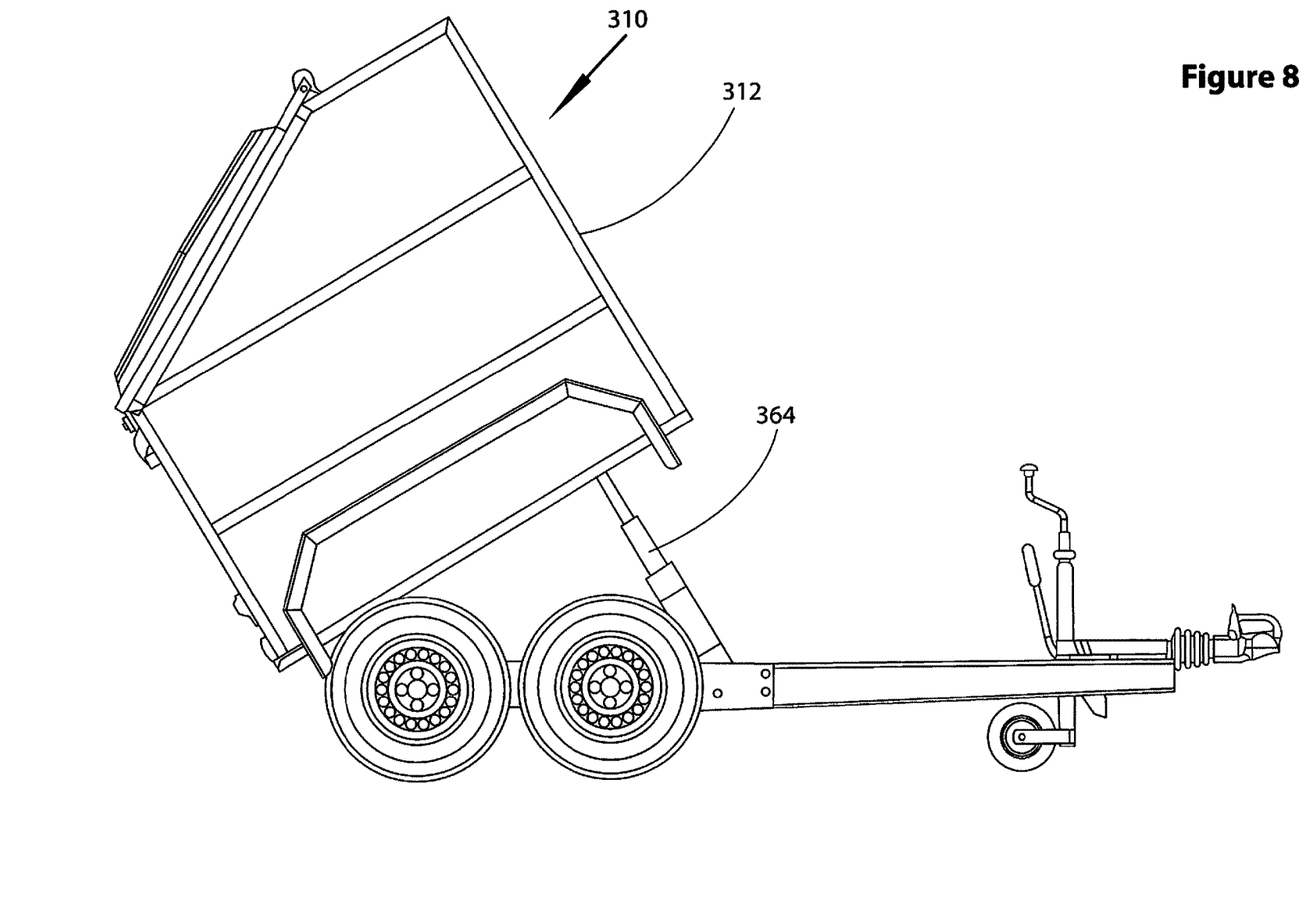
FIG. 8 is a side view of an improved skip according to a fourth embodiment of the present invention.

A fourth embodiment of the skip 310 of the present invention is shown in FIG. 8. In this embodiment, the skip 310 incorporates a lifting mechanism 364 adapted to raise the skip body 312 to facilitate emptying of the skip 310 when required.

Figure 9:
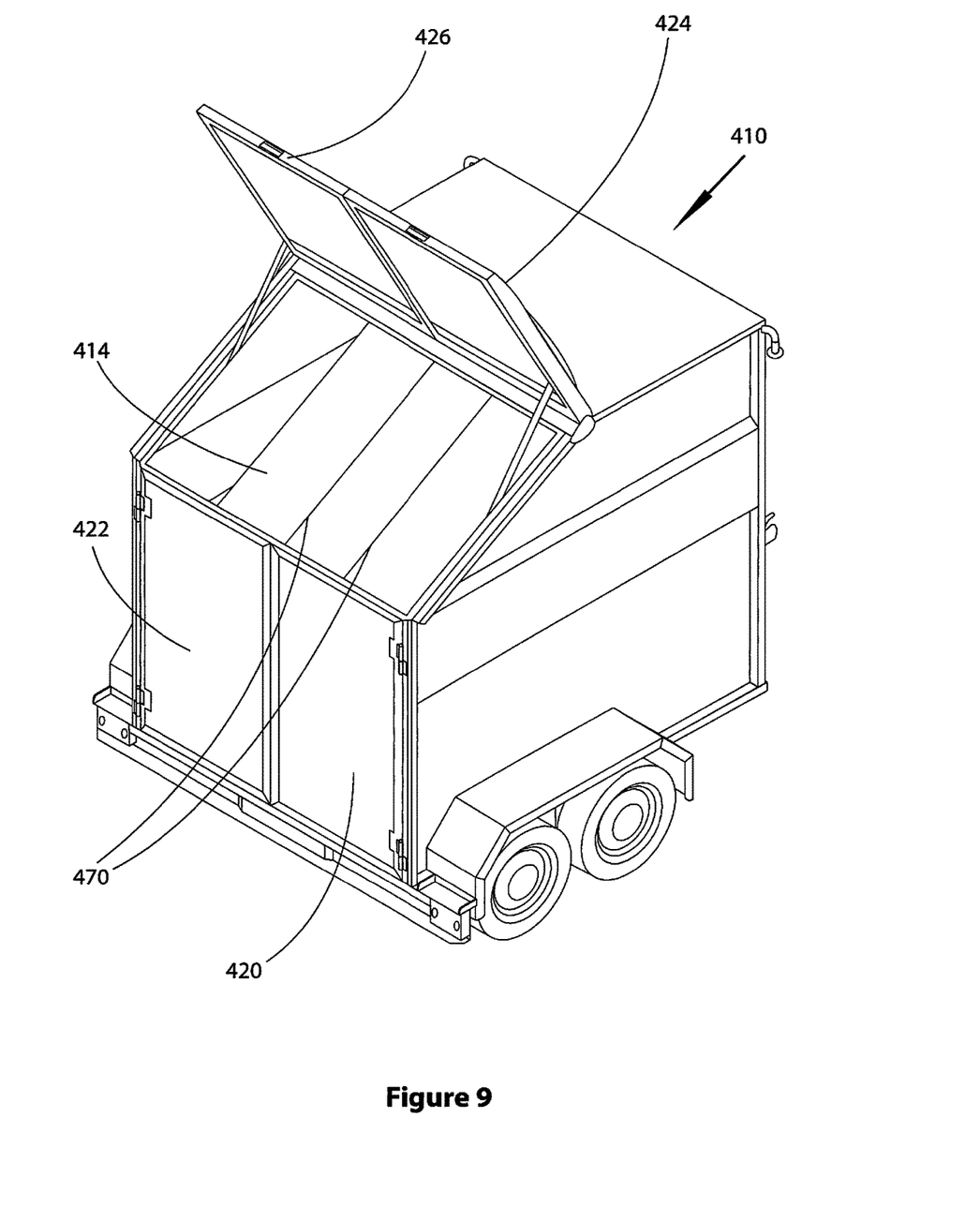
FIG. 9 is a perspective view of an improved skip according to a fifth embodiment of the present invention.

Referring to FIG. 9, a fifth embodiment of the skip 410 according to the present invention is shown. In this embodiment the skip 410 incorporates a number of internal separation panels 470 for dividing the interior 414 of the skip 410 into sections. With the vertically opening doors 424, 426 in the open position, waste can be dropped into the skip 410 into a desired section, pre-segregating the waste material.

To empty the skip 410, the horizontally opening doors 420,422 can be opened and the segregated waste removed. The internal separation panels 470 can also be removed increasing the utility of the skip 410 of the fifth embodiment.

Various modifications and improvements may be made to the above described embodiments without departing from the scope of the invention. For example, where the skip body can be elevated with respect to the trailer, as described in the third embodiment, in alternative embodiments, only the base of the skip may be elevated with respect to the trailer.

The invention claimed is:

1. A skip for domestic and/or industrial waste, the skip comprising: a body, the body defining an opening and having an interior adapted to receive waste, and comprising first and second doors attached to the body, each door being movable between an open position and a closed position, the doors combining in the closed position to close the opening; wherein the first door pivots relative to the body about a vertical axis; wherein the second door pivots relative to the body about a horizontal axis at a top edge of the second door; wherein a bottom edge of the second door is positioned above a top edge of the first door when the first and second doors are in the closed position; wherein the second door, in the closed position, extends forward and upward from the top edge of the first door, such that the first and second doors define an obtuse angle when the first and second doors are in the closed position, and wherein the body is mounted on a frame having wheels and a tow hitch for releasably connecting to a vehicle.

2. A skip according to claim 1 wherein, in the closed position, the first door and the second door are in contact along a common edge.

3. A skip according to claim 1 wherein the first door is hingedly attached to the body along a side edge of the first door.

4. A skip according to claim 1 wherein, in the closed position, one of the first and second doors retains the other of the first and second doors in the closed position.

5. A skip according to claim 4 wherein, in the closed position, the first and second doors are arranged such that fixedly securing one of the first and second doors with respect to the body fixedly secures the other of the first and second doors with respect to the body.

6. A skip according to claim 1 comprising a locking means to fixedly secure the first and second doors in the closed position.

7. A skip according to claim 1 comprising one or more partitions adapted to divide up the body interior.

8. A skip according to claim 7 wherein each of the partitions is releaseably connected to the body.

9. A skip according to claim 1 wherein the body is movable with respect to the frame.

10. A skip according to claim 9 further comprising elevation means adapted to elevate at least a portion of the body with respect to the frame wherein the elevation means moves the body from a load position to an unload position, such that waste material within the skip is biased towards the opening in the unload position due to the effects of gravity.

11. A skip according to claim 1 wherein the skip includes a waste processing device.

12. A skip according to claim 1, wherein the body comprises a plurality of walls, at least one of the walls having a non-linear cross-section adapted to strengthen the one of the walls.

13. A skip according to claim 1, wherein the bottom edge of the second door rests on the top edge of the first door when the doors are in the closed position.

14. A skip according to claim 1, wherein the skip further comprises third and fourth doors attached to the body, each of the third and fourth doors being movable between an open position and a closed position, the third and fourth doors combining with the first and second doors in the closed position to close the opening; wherein the third door pivots relative to the body about a vertical axis; wherein the fourth door pivots relative to the body about the horizontal axis at a top edge of the fourth door; wherein a bottom edge of the fourth door is positioned above a top edge of the third door when the third and fourth doors are in the closed position; wherein the fourth door, in the closed position, extends forward and upward from the top edge of the third door, such that the third and fourth doors define an obtuse angle when the third and fourth doors are in the closed position.

15. A skip according to claim 14 wherein, in the closed position, the third door and the fourth door are in contact along a common edge.

16. A skip according to claim 14 wherein the third door is hingedly attached to the body along a side edge of the third door.

17. A skip according to claim 14 wherein, in the closed position, one of the third and fourth doors retains the other of the third and fourth doors in the closed position.

18. A skip according to claim 17 wherein, in the closed position, the third and fourth doors are arranged such that fixedly securing one of the third and fourth doors with respect to the body fixedly secures the other of the third and fourth doors with respect to the body.

19. A skip according to claim 14 wherein the second and fourth doors have respective front lips such that, when the first, second, third and fourth doors are in the closed position, the front lip of the second door hangs down in front of the first door and the front lip of the fourth door hangs down in front of the third door, preventing opening of the first and third doors.

20. A skip according to claim 19 wherein, when the doors are in the closed position, the fourth door overlaps the second door such that the first, second and third doors are held shut by the fourth door.

21. A skip according to claim 14 wherein the skip has no internal bracing structures in the skip interior.

22. A skip according to claim 14 wherein the skip has no cross beams between any of the first, second, third and fourth doors so as to facilitate a user being able to walk into the skip interior.

* * * * *